No. 624,098. Patented May 2, 1899.
A. ROESCH.
THERMOSTAT.
(Application filed Dec. 29, 1897.)
(No Model.)

WITNESSES:
D. N. Hayford
J. C. Chapin.

INVENTOR
Alfred Roesch
BY
James B. Diel
ATTORNEY

THE NORRIS PETERS CO., PHOTO-LITHO., WASHINGTON, D. C.

UNITED STATES PATENT OFFICE.

ALFRED ROESCH, OF BRIDGEPORT, CONNECTICUT.

THERMOSTAT.

SPECIFICATION forming part of Letters Patent No. 624,098, dated May 2, 1899.

Application filed December 29, 1897. Serial No. 664,424. (No model.)

*To all whom it may concern:*

Be it known that I, ALFRED ROESCH, a citizen of the United States, residing at Bridgeport, in the county of Fairfield, in the State of Connecticut, have invented a new and useful Improvement in Thermostats, of which the following is a specification.

My invention relates more particularly to improvements in thermostats in use for regulating the temperature of rooms or buildings by controlling the heating system and causing the supply of heat therefrom to be cut off or thrown on at a predetermined temperature.

My invention consists in a regulating device for adjustment of the thermostat; and the object of my invention is to readily and simply adjust the thermostat to cause the same to cut off or turn on the supply of heat at any desired temperature.

My invention further consists in certain improved combinations and details of construction, as will hereinafter more fully appear.

I will now proceed to describe my invention with reference to the accompanying drawings, and will then point out the novel features in the claim.

Figure 1:
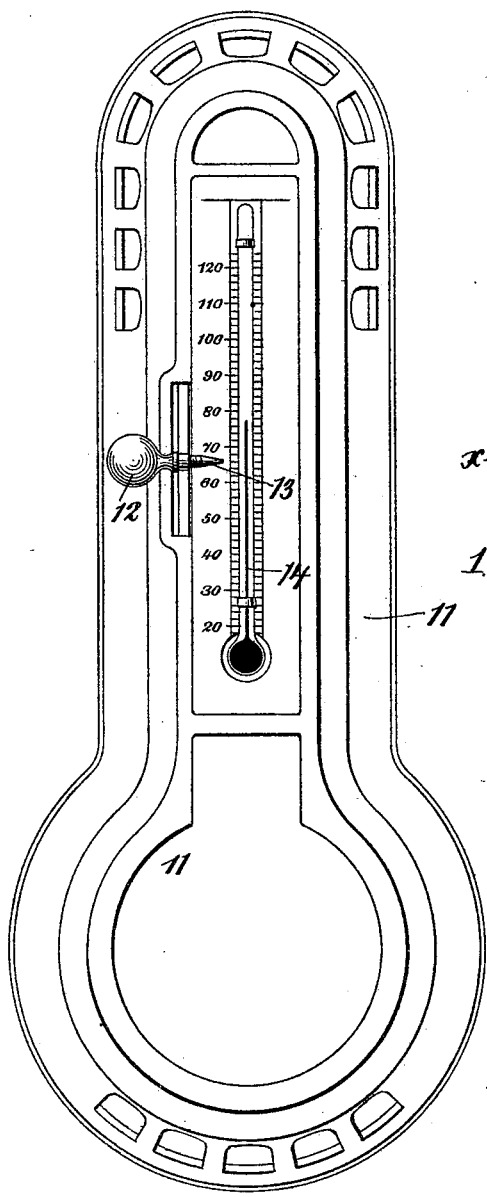
Figure 2:
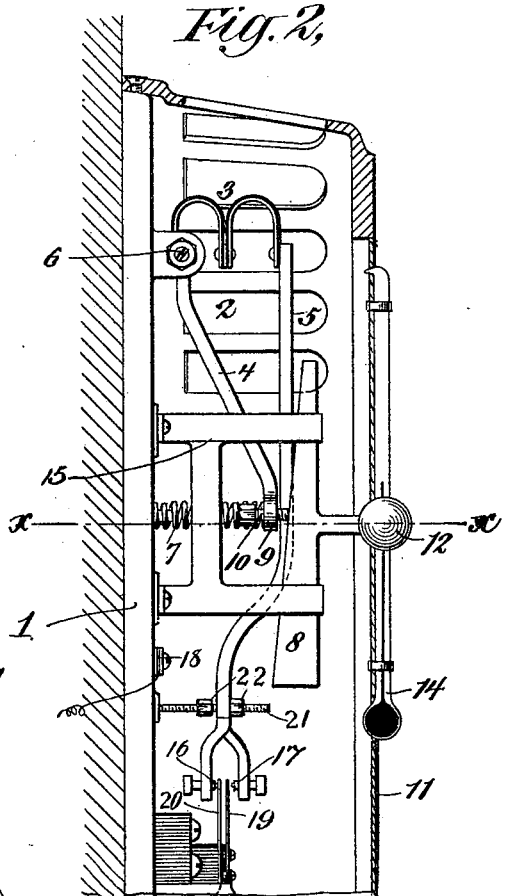
Figure 3:
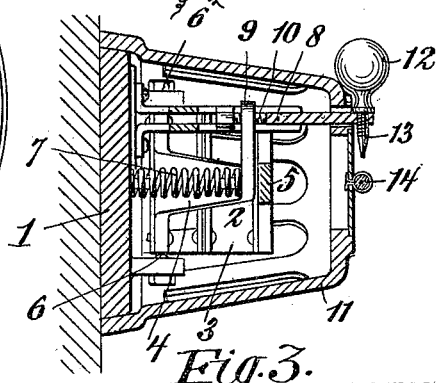

Figure 1 is a face view of a thermostat embodying my invention. Fig. 2 is a side elevation of a portion of the interior of the same with the outer casing thereof in longitudinal section. Fig. 3 is a cross-section of same on the plane of the line $x \, x$, Fig. 2.

Similar reference characters designate corresponding parts in all the figures.

1 designates the base on which the thermostat is mounted.

2 is the thermostat proper, comprising the compound curved plates 3 3, the arm 4, and the operating-lever 5.

The thermostat 2 is pivotally mounted upon the base-plate 1, as at 6 6. These are preferably cone-points for the purpose of reducing friction, and I have here shown them as such.

7 designates a coil-spring in compression between the base-plate and the end of the arm 4.

8 designates a wedge-shaped slide mounted in slideways attached to the base and adapted to move longitudinally therein. The slideways, as here shown and designated by the reference character 15, consist of a skeleton framework looped around the wedge-shaped slide and attached to the base by screws passing through feet formed by bending out portions of said framework. The bearing thus formed will permit longitudinal movement of the slide, but will prevent lateral movement thereof. The lower or wedge-shaped surface of the slide bears against a projection 9 from the arm 4, the point on such projection against which said slide bears being an adjusting-screw 10. This adjusting-screw is for the purpose of procuring an accurate initial adjustment of the arm relative to the slide.

The slide 8 has a projection or lug rising therefrom and extending through a slot in the casing 11, which incloses the thermostat. The outer end of said projection carries a finger-piece and indicator, the finger-piece comprising a spherically-shaped portion 12 and the indicator a finger 13, which points toward a graduated scale indicating different degrees of temperature.

14 is a mercury-tube of ordinary form, the mercury-tube and graduated scale constituting a thermometer.

It will now be seen that an adjustment of the slide longitudinally, which may readily be made by taking hold of the finger-piece and moving it in a direction lengthwise of the device, will depress or elevate the thermostat, and thereby cause same to operate at different temperatures in a manner well known. The graduations on the scale are so arranged with reference to the wedge-shaped slide that the same will cause the thermostat to operate to cut off the heat-supply or turn on the supply, as the case may be, at whatever temperature the pointer designates on the scale. The provision of a thermometer-tube alongside of said scale forms an exceedingly convenient means for indicating how nearly said temperature is approached.

It is of course understood that the operating-lever 5 is adapted to connect with and operate in any well-known manner, either electrically, mechanically, or otherwise, the valves or other controlling mechanism of a heat-regulating system. In the drawings I have shown the operating-lever as adapted to close and break electric circuits. The end of the lever is bifurcated and carries two contactpoints 16 17. The lever connects with the line-wire through the bearing and the base, and the terminals 18 19 20 designate metal fingers having wire attached which lead to electrically-controlled mechanism for regulating a heat-supply. The movement of the lever in one direction or another will make and break circuits through 17 19 18 and 16 20 18. The fingers 19 20 are insulated from the base. 21 designates a screw-threaded stud having nuts 22 22, which are adjustable thereon and which serve as adjustable stops for limiting the throw of the lever 5. I have not shown any such device in detail, as the same does not constitute any part of this invention.

It will be seen that I have here described and shown an extremely simple and effective means for regulating a thermostat for operating at any desired temperature, the means being not only simple in the operation of the working parts, but also in the arrangement of the part to be moved by hand, the hand movement or operation on the part of the person adjusting the same being an obvious one and not one that would require previous instruction or one in which there would be any liability of mistake.

What I claim is—

In a thermostat the combination of the compound plates the operating-lever and the arm all secured together and pivotally mounted on a suitable support, of a spring adapted to exert pressure between the operating-lever and a fixed support, adjustable stops for limiting the throw of the lever in either direction, a wedge-shaped slide adapted to be adjusted longitudinally for the purpose of regulating or adjusting the said arm, an adjustable screw carried by the said arm and adapted to bear against the inclined face of said wedge-shaped slide, for the purpose of said adjustment and an indicator-finger carried by the slide substantially as specified.

In testimony whereof I have signed my name to this specification in the presence of two subscribing witnesses.

ALFRED ROESCH.

Witnesses:
JNO. S. PARKER,
FRED. H. DAVIS.